United States Patent Office 3,463,022
Patented Aug. 26, 1969

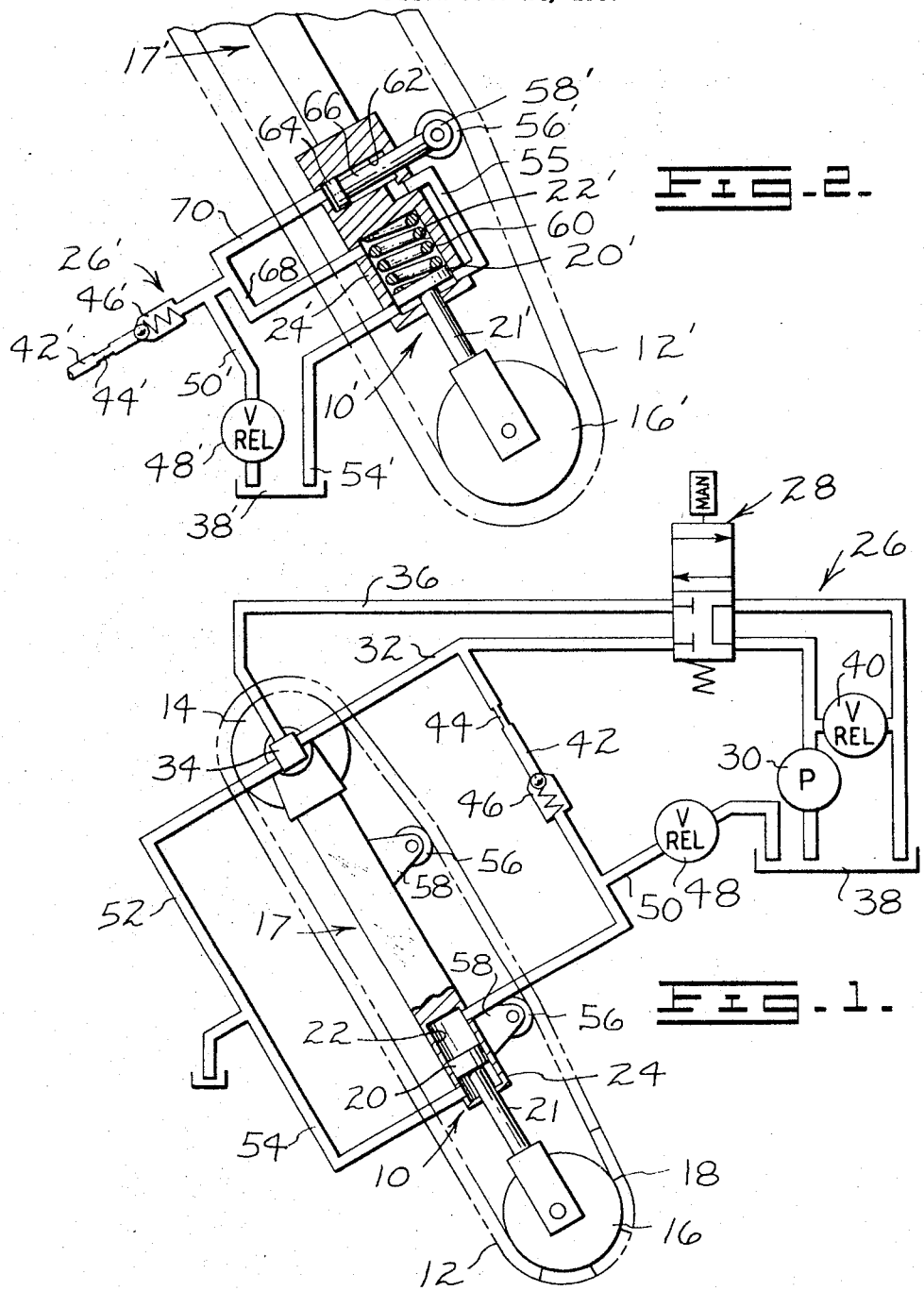

3,463,022
CHAIN ADJUSTER
Lawrence J. Miller, Joliet, Ill., assignor to Caterpillar Tractor Co., Peoria, Ill., a corporation of California
Filed Oct. 24, 1967, Ser. No. 677,529
Int. Cl. F16h 7/12, 7/14
U.S. Cl. 74—227    3 Claims

ABSTRACT OF THE DISCLOSURE

An adjuster for a chain movable around a rotary chain support member, the adjuster providing hydraulic means including a piston connected to the chain support member for exerting a predetermined pressure on the chain support member, flexible means for preventing a pressure increase caused by external forces acting on the chain support member, and means for maintaining a predetermined degree of sag in the chain.

---

Adjusters for chains have been known in the prior art, and have found an important use in connection with the endless chains for scraper elevators, such as disclosed in Creighton, et al., U.S. Patent 3,161,280, issued Dec. 15, 1964. Proper chain tension adjustment is required to avoid excessive tightness resulting in an excessive amount of horsepower being used to drive the chain due to the high internal frictional forces, or excessive slack causing the chain to separate from the chain-driving mechanism and to break. Proper chain adjustment is also required to maintain a desired degree of sag in the chain.

It has often been required that the known adjusters be manually serviced frequently such as every two hundred hours of operation, with an excessive amount of time and labor being involved. The known adjusters have often failed to compensate for external forces acting on the elevator in the plane of the elevator frame and causing damage to the elevator or to compensate for an excessive degree of sag in the chain.

The present invention is designed to overcome the above discussed problems of the prior art. The advantages of the invention will become apparent to one skilled in the art from the following description thereof when read in conjunction with the accompanying drawing in which:

FIG. 1 is a schematic side elevational view being partly in section of a chain adjuster constructed in accordance with the invention and a hydraulic control system associated therewith; and FIG. 2 is an enlarged fragmentary view of a chain adjuster of modified structure in accordance with the invention.

In FIG. 1, there is shown a chain adjuster 10 constructed in accordance with the invention. The adjuster 10 is associated with a conventional endless chain 12 rotatable about an upper sprocket wheel 14 and a lower idler wheel 16 mounted on a frame 17 of a scraper elevator. The chain 12 is one of a pair of chains mounted on the frame and is connected to the other chain (not shown) by a plurality of flights 18. The adjuster 10 provides a piston 20 having a piston rod 21 connected to the idler wheel 16 and being reciprocatable within a chamber 22 formed in a cylinder 24 mounted on the frame 17.

Associated with the scraper elevator is a hydraulic control system 26 which includes a manually operated two-way valve 28 for selectively directing hydraulic fluid from a pump 30 through a conduit 32 to an elevator drive motor 34 and through a conduit 36 back to a reservoir 38. A relief valve 40 protects the pump from high back pressures. A conduit 42, provided with an orifice 44 and a check valve 46 extends between the conduit 32 and the chamber 22. A relief valve 48 is positioned in a conduit 50 communicating with the conduit 42. The two conduits 52, 54 serve to drain hydraulic fluid from the motor 34 and chamber 22, respectively.

Two carrier rollers 56 are mounted on the frame 17 by means of brackets 58 and bear against the chain 12.

During running of the elevator, hydraulic fluid is directed by the pump 30 through the valve 28 and the conduits 32, 36 for operation of the motor 34 and the consequent rotation of the sprocket wheel 14 and advancement of the chain 12. Hydraulic fluid also passes from the conduit 32 into the conduit 42 through the orifice 44 and the check valve 46 and into the chamber 22. Such fluid exerts pressure on the piston 20 which is transmitted through the piston rod 21 to the idler wheel 16 for tensioning of the chain 12. At the same time the carrier rollers 56 direct the chain 12 on a predetermined path. The orifice 44 insures that the elevator drive circuit 32, 36 receives priority over the chain adjustment circuit 42. The relief valve 48 protects the system 26 against high pressure surges caused by external forces acting against the idler 16 and parallel to the frame 17. The drain line 52 for the motor 34 returns hydraulic fluid to the reservoir while the drain line 54 similarly returns any leakage past the piston 20 to the reservoir.

Referring to FIG. 2, there is shown a modified chain tension adjuster 10'. The adjuster 10' provides a cylinder 24' mounted on a frame 17', and having a chamber 22'. Within the chamber is reciprocatable a piston 20' having a piston rod 21' secured to an idler wheel 16' for a chain 12'. Positioned within the chamber 22' is a compression spring 60 which bears against the piston 20'.

The cylinder 24' provides a further and transversely extending chamber 62 within which is positioned a piston 64 having a piston rod 66 connected by a bracket 58' to a carrier roller 56' which bears against the chain 12'.

A hydraulic system 26' supplies fluid through a conduit 42' which is provided with an orifice 44' and a check valve 46' to conduits 68 and 70 which communicate with the chambers 22' and 62, respectively.

A conduit 50' communicating with the conduit 42' is provided with a relief valve 48'. Drain lines 54' and 55 provide communication between the chamber 62, the lower end of chamber 22' and reservoir 38'.

The chain adjuster 10' operates in a manner similar to the chain adjuster 10 of FIG. 1. Hydraulic fluid received through the conduits 42' and 68 enters the chamber 22' and exerts pressure on the piston 20' which pressure is transmitted through the piston rod 21' to the idler wheel 16' for tensioning of the chain. Hydraulic fluid is also directed through the conduit 70 into the chamber 62 for exerting pressure against the piston 64 which pressure is transmitted through the piston rod 66 and bracket 58' to the carrier roller 56' for maintenance of the proper degree of sag in the chain 12'.

When the idler 16' is subjected to an external force acting parallel to the frame 17', the idler recoils and the shock is absorbed partially by the spring 60 and partially by the fluid within the chamber 22' and the supply system. Fluid is transferred through the conduits 68 and 70 to the chamber 62 for the exertion of additional pressure on the piston 64 and carrier roller 56' for the maintenance of the desired degree of sag in the chain. Fluid may also be returned to the reservoir through the conduits 42' and 50' and the relief valve 48'.

The adjusters 10 and 10' each provide automatic adjustment of the tensions in the respectively associated chains consequently eliminating the need for manual adjustment and providing substantial savings with respect to the maintenance of the chain in good operating condition. The adjusters 10 and 10' are each designed to provide protection against high pressure surges caused by external pressures acting on the respectively associated idlers 16 or 16'. The adjuster 10' in addition provides for automatic maintenance of the desired degree of sag in the chain during recoil of the idler. The recoil spring 60 allows a lower setting for relief valve 48' than for relief valve 48 because of its added force for holding the sprocket and idlers apart. Spring 60 allows recoil of the idler and also aids in returning the idler to its normal operating position.

I claim:

1. In a chain drive comprising an endless chain extending over a sprocket and an idler spaced from the sprocket, a hydraulic motor for driving the sprocket, a hydraulic tensioning device for applying a desired tension to the chain, a single source of hydraulic fluid under pressure to activate the motor and activate the tensioning device, separate hydraulic circuits for the motor and the tensioning device, a passage to admit fluid from the motor circuit to the tensioning circuit, and a restriction in said passage to insure priority of fluid pressure to the motor.

2. The invention of claim 1 with a check valve to prevent flow from the tensioning circuit to the motor circuit and a pressure relief valve in the tensioning circuit to limit pressure therein and insure desirable chain sag.

3. The invention of claim 2 with a carrier roller engaging the chain and means utilizing fluid pressure in the tensioning circuit for urging the carrier roller toward the chain.

References Cited

UNITED STATES PATENTS

| | | | |
|---|---|---|---|
| 1,368,652 | 2/1921 | Pennington et al. | |
| 1,663,344 | 3/1928 | Lennard | 74—242.14 XR |
| 2,610,517 | 9/1952 | Hornbostel | 74—242.11 |
| 2,624,205 | 1/1953 | Ellstrom | 74—242.14 |
| 3,082,043 | 3/1963 | Orton | 74—242.14 XR |
| 3,108,387 | 10/1963 | Penote. | |

FOREIGN PATENTS 279,415  3/1952  Switzerland.

FRED C. MATTERN, JR., Primary Examiner

J. A. WONG, Assistant Examiner

U.S. Cl. X.R.

74—242.11, 242.14